United States Patent
Cho et al.

(10) Patent No.: US 9,842,273 B2
(45) Date of Patent: Dec. 12, 2017

(54) APPARATUS AND METHOD FOR DETECTING KEY POINT USING HIGH-ORDER LAPLACIAN OF GAUSSIAN (LOG) KERNEL

(71) Applicant: Electronics and Telecommunications Research Institute, Daejeon (KR)

(72) Inventors: Yong Ju Cho, Daejeon (KR); Unsang Park, Seoul (KR); Joo Myoung Seok, Daejeon (KR); Sang Woo Ahn, Daejeon (KR); Ji Hun Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/064,800

(22) Filed: Mar. 9, 2016

(65) Prior Publication Data
US 2016/0267347 A1    Sep. 15, 2016

(30) Foreign Application Priority Data
Mar. 9, 2015 (KR) .................. 10-2015-0032698

(51) Int. Cl.
*G06K 9/46* (2006.01)

(52) U.S. Cl.
CPC ............................... *G06K 9/4671* (2013.01)

(58) Field of Classification Search
CPC .. G06K 9/4609; G06K 9/4642; G06K 9/6215; G06K 9/6211
See application file for complete search history.

(56) References Cited

U.S. PATENT DOCUMENTS

| | | | |
|---|---|---|---|
| 6,711,293 B1 | 3/2004 | Lowe | |
| 7,570,804 B2 | 8/2009 | Kim et al. | |
| 9,152,888 B2* | 10/2015 | Kenyon | G06K 9/80 |
| 9,530,073 B2* | 12/2016 | Hamsici | G06K 9/4671 |
| 2004/0122667 A1 | 6/2004 | Lee et al. | |
| 2007/0211928 A1* | 9/2007 | Weng | G01N 30/8624 382/128 |
| 2007/0217676 A1* | 9/2007 | Grauman | G06K 9/4671 382/170 |

(Continued)

OTHER PUBLICATIONS

Aguilar, J. "High-Order Corrected TrapezoidalQuadrature Rules for the Coulomb Potential in Three Dimensions" Computers and Mathematics with Applications 49 (2005) 625-631.*

(Continued)

*Primary Examiner* — Chan Park
*Assistant Examiner* — Mia M Thomas
(74) *Attorney, Agent, or Firm* — Kile Park Reed & Houtteman PLLC

(57) ABSTRACT

Provided is an apparatus and method for detecting a key point using a high-order Laplacian of Gaussian (LoG) kernel. The high-order LoG kernel is generated based on an LoG operator which is calculated by sequentially differentiating an LoG operator with respect to x and y of an image. A scale space is generated based on the high-order LoG kernel and the key point is detected by comparing a current pixel in the scale space to pixels adjacent to the current pixel.

10 Claims, 6 Drawing Sheets

(56) References Cited

U.S. PATENT DOCUMENTS

| | | | | |
|---|---|---|---|---|
| 2008/0253622 A1* | 10/2008 | Tosa | ............... | G06K 9/00604 382/117 |
| 2009/0217315 A1* | 8/2009 | Malik | ............... | G06K 9/00362 725/9 |
| 2010/0188519 A1* | 7/2010 | Yamaoka | ............ | G06K 9/00369 348/222.1 |
| 2010/0268301 A1* | 10/2010 | Parikh | ............... | G06K 9/4628 607/54 |
| 2010/0290710 A1* | 11/2010 | Gagvani | ............ | G06K 9/00543 382/224 |
| 2012/0183224 A1* | 7/2012 | Kirsch | ............... | G06K 9/4619 382/195 |
| 2013/0308860 A1* | 11/2013 | Mainali | ............ | G06K 9/4671 382/170 |
| 2014/0072208 A1* | 3/2014 | Kenyon | ............... | G06K 9/80 382/159 |
| 2014/0212048 A1 | 7/2014 | Akagunduz | | |
| 2015/0003743 A1* | 1/2015 | Nosaka | ............ | G08B 13/19604 382/203 |
| 2015/0286864 A1* | 10/2015 | Gottemukkula | ..... | G06K 9/0061 382/117 |
| 2015/0363644 A1* | 12/2015 | Wnuk | ............... | G06T 11/206 382/103 |
| 2017/0011280 A1* | 1/2017 | Soldevila | ............ | G06K 9/00362 |

OTHER PUBLICATIONS

Lowe, D. "Distinctive Image Features from Scale-Invariant Keypoints" International Journal of Computer Vision, 2004, pp. 1-28.*

Bay, H. "From Wide-baseline Point and Line Correspondences to 3D" Swiss Federal Institute of Technology (2006), pp. 1-203.*

Herbert Bay, et al., "Speeded-Up Robust Features (SURF)", ScienceDirect; Computer Vision and Image Understanding, vol. 110, (2008), pp. 346-359.

* cited by examiner

FIG. 2

Matrix 220:

| 0  | -1 | 0  | -1 | 0  |
|----|----|----|----|----|
| -1 | -2 | 1  | -2 | -1 |
| 0  | 1  | 12 | 1  | 0  |
| -1 | -2 | 1  | -2 | -1 |
| 0  | -1 | 0  | -1 | 0  |

Matrix 210:

| 0 | 0 | 1   | 0 | 0 |
|---|---|-----|---|---|
| 0 | 1 | 2   | 1 | 0 |
| 1 | 2 | -16 | 2 | 1 |
| 0 | 1 | 2   | 1 | 0 |
| 0 | 0 | 1   | 0 | 0 |

APPARATUS AND METHOD FOR DETECTING KEY POINT USING HIGH-ORDER LAPLACIAN OF GAUSSIAN (LOG) KERNEL

CROSS-REFERENCE TO RELATED APPLICATION

This application claims the priority benefit of Korean Patent Application No. 10-2015-0032698, filed on Mar. 9, 2015, in the Korean Intellectual Property Office, the disclosure of which is incorporated herein by reference.

BACKGROUND

1. Field of the Invention

Embodiments relate to an apparatus and method for detecting a key point from an image using a high-order Laplacian of Gaussian (LoG) kernel.

2. Description of the Related Art

A key point is a point that presents at a unique point of an image and is robust against affine or atypical changes. Accordingly, a method of detecting a key point from an image for searching an image or generating a panorama image has been developed.

A conventional method of detecting a key point may detect a key point from an image using a difference of Gaussian (DoG) kernel. However, a number of key points detected by using the DoG kernel is limited.

Therefore, aside from the method of detecting a key point using the DoG kernel, a method of detecting a greater number of key points has been requested.

SUMMARY

According to an aspect, there is provided a method of detecting a key point of an image, the method including generating a high-order Laplacian of Gaussian (LoG) kernel using an LoG operator, and detecting a key point of an image using the high-order LoG kernel.

The generating of the high-order LoG kernel may include calculating a high-order LoG operator by sequentially differentiating the LoG operator, and generating the high-order LoG kernel based on the high-order LoG operator.

The high-order LoG operator may be a high-order differential coefficient of the LoG operator.

The detecting of the key point may include generating a scale space based on the high-order LoG kernel, and detecting the key point by comparing a current pixel in the scale space to pixels adjacent to the current pixel.

The generating of the scale space may include generating the scale space by performing a convolution operation on the image by changing a σ value included in a high-order LoG operator to kσ, $k^2\sigma$, $k^3\sigma$, and $k^4\sigma$, using a predetermined constant k.

The method of detecting a key point of an image may further include searching an image corresponding to a current image based on the key point.

The searching of the image may include searching for a number of key points of which a similarity between a key point detected from a current image and a key point detected from another image is greater than or equal to a threshold value, and determining another image of which the found number of key points is greater than or equal to the threshold value, as the image corresponding to the current image.

According to another aspect, there is provided an apparatus for detecting a key point of an image, the apparatus including a processor configured to generate a high-order LoG kernel using an LoG operator and detect a key point of an image using the high-order LoG kernel.

The processor may be configured to calculate a high-order operator by sequentially differentiating the LoG operator and generate the high-order LoG kernel based on the high-order LoG operator.

The high-order LoG operator may be a high-order differential coefficient of the LoG operator.

The processor may be configured to generate a scale space based on the high-order LoG kernel and detect the key point by comparing a current pixel in the scale space to pixels adjacent to the current pixel.

The processor may be configured to generate the scale space by performing a convolution operation on the image by changing a σ value included in a high-order LoG operator to kσ, $k^2\sigma$, $k^3\sigma$, and $k^4\sigma$, using a predetermined constant k.

The processor may be configured to search an image corresponding to a current image based on the key point.

The processor may be configured to search for a number of key points of which a similarity between a key point detected from a current image and a key point detected from another image is greater than or equal to a threshold value, and determine another image of which the found number of key points is greater than or equal to the threshold value, as the image corresponding to the current image.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 2 illustrates an example of generating a high-order Laplacian of Gaussian (LoG) according to an embodiment;

DETAILED DESCRIPTION

Figure 1:
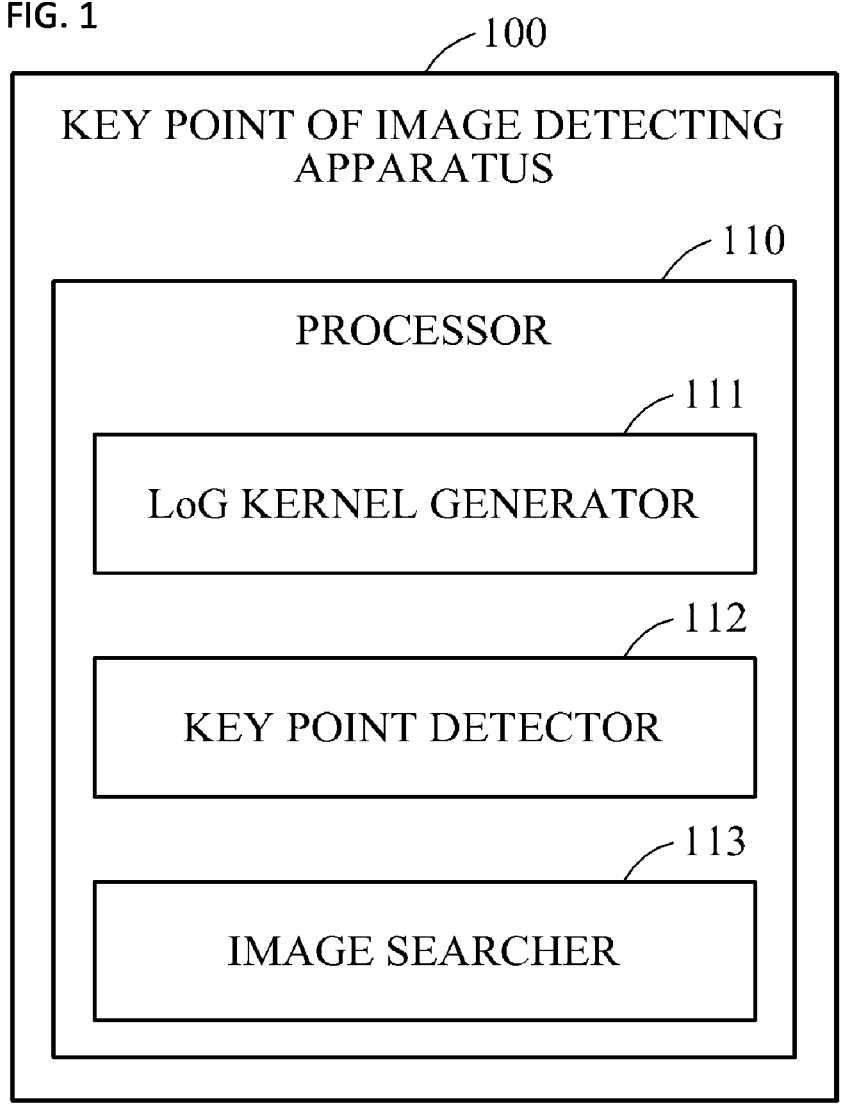
FIG. 1 is a block diagram illustrating a key point of image detecting apparatus according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures. A method of detecting a key point of an image according to an embodiment may be performed by an apparatus for detecting a key point of an image.

FIG. 1 is a block diagram illustrating a key point of image detecting apparatus according to an embodiment.

Referring to FIG. 1, an apparatus 100 for detecting a key point of an image, hereinafter referred to as a key point of image detecting apparatus 100, includes a processor 110. The processor 110 may include at least one of a Laplacian of Gaussian (LoG) kernel generator 111, a key point detector 112, and an image searcher 113. For example, when the key point of image detecting apparatus 100 includes a plurality of processors, for example, the processor 110, the LoG kernel generator 111, the key point detector 112, and the image searcher 113 may be included in different processors.

The LoG kernel generator 111 generates a high-order LoG kernel using a LoG operator. The LoG operator may be an operator that calculates a result in which an image filtered by a Gaussian filter is re-filtered by a Laplacian filter. An LoG may be a result in which a result of filtering x and y of an image using a Gaussian function is second-order differentiated using a Laplacian function. The LoG kernel generator 111 may filter x and y of an image by performing a convolution operation using the Gaussian function.

Accordingly, an LoG operator $\nabla^2 G$ may be expressed as shown in Equation 1.

$$\nabla^2 G = \left(\frac{x^2 + y^2 - 2\sigma^2}{\sigma^4}\right) e^{(-(x^2+y^2)/2\sigma^2)} \quad \text{[Equation 1]}$$

In Equation 1, the LoG kernel generator 111 calculates a high-order LoG operator by sequentially differentiating the LoG operator with respect to x and y of an image. The high-order LoG operator may be a high-order differential coefficient of the LoG operator. For example, the LoG kernel generator 111 may calculate a high-order LoG operator $\nabla^4 G$, as shown in Equation 2, by fourth-order differentiating the LoG operator with respect to x and y of the image.

$$\nabla^4 G = \left(\frac{x^4 + y^4 - 6(x^2 + y^2)\sigma^2 + 6\sigma^4}{\sigma^8}\right) e^{(-(x^2+y^2)/2\sigma^2)} \quad \text{[Equation 2]}$$

The LoG kernel generator 111 calculates high-order operators $\nabla^6 G$ and $\nabla^8 G$ by sixth-order and eighth-order differentiating the LoG operators with respect to x and y of the image.

The LoG kernel generator 111 may generate the high-order LoG kernel based on the calculated high-order LoG operators. The high-order LoG kernel may be a mask for performing a convolution on a function using the high-order LoG operator.

The key point detector 112 detects a key point of an image using the high-order LoG kernel generated by the LoG kernel generator 111.

The key point detector 112 performs a convolution operation on the image and generates a scale space based on the high-order LoG kernel generated by the LoG kernel generator 111.

The key point detector 112 generates a plurality of images to be included in the scale space by performing the convolution operation on the images by changing a σ value included in the high-order LoG operator to kσ, k²σ, k³σ, and k⁴σ, using a predetermined constant k. For example, the key point detector 112 may change a σ value included in the high-order LoG operator to $\sqrt{2}$, $\sqrt{2}^2$, $\sqrt{2}^3$, and $\sqrt{2}^4$.

The key point detector 112 detects the key point by comparing a current pixel in the scale space to pixels adjacent to the current pixel.

The key point detector 112 may compare each of pixels of the plurality of images included in the scale space to pixels adjacent to up, down, left and right. A pixel to be processed for detecting a current key point among the pixels of the plurality of images may be a current pixel, and the pixels adjacent to up, down, left and right of the current pixel may be adjacent pixels.

The key point detector 112 may detect a pixel indicating a maximum value or a minimum value among the adjacent pixels, as a key point of an image. For example, the key point detector 112 may compare each of the pixels of the plurality of images to 26 pixels in up, down, left and right.

The image searcher 113 searches an image corresponding to a current image based on the key point detected by the key point detector 112. The image corresponding to the current image may be an image similar to the current image having a value greater than or equal to a threshold value.

The image searcher 113 may calculate a similarity between a key point detected from the current image and a key point detected from another image by comparing the key point detected from the current image to the key point detected from another image.

The image searcher 113 may search for a number of key points having the calculated similarity greater than or equal to the threshold value.

The image searcher 113 may determine another image of which the found number of key points is greater than or equal to the threshold value, as the image corresponding to the current image.

The key point of image detecting apparatus 100 may detect an additional key point in addition to a key point to be detected using a difference of Gaussian (DoG) kernel or the LoG kernel, by detecting a key point using a high-order LoG kernel generated based on a high-order differential coefficient of the LoG operator. Concisely, since the key point of image detecting apparatus 100 detects more key points than a conventional key point detecting apparatus, a superior result may be obtained in image processing based on a key point, for example, image searching and panorama image generating.

FIG. 2 illustrates an example of generating a high-order LoG according to an embodiment.

The LoG kernel generator 111 generates an LoG kernel 210 in a 5×5 size that corresponds to an LoG operator $\nabla^2 G$. The LoG kernel generator 111 may calculate a high-order Operator $\nabla^4 G$ which is a result of fourth-order differentiating x and y of an image by differentiating an LoG operator.

The LoG kernel generator 111 generates a high-order LoG kernel 220 in a 5×5 size that corresponds to a high-order LoG operator $\nabla^4 G$. Referring to FIG. 2, a number of non-zero values may increase in the high-order LoG kernel 220 than of the LoG kernel 210.

Figure 3:
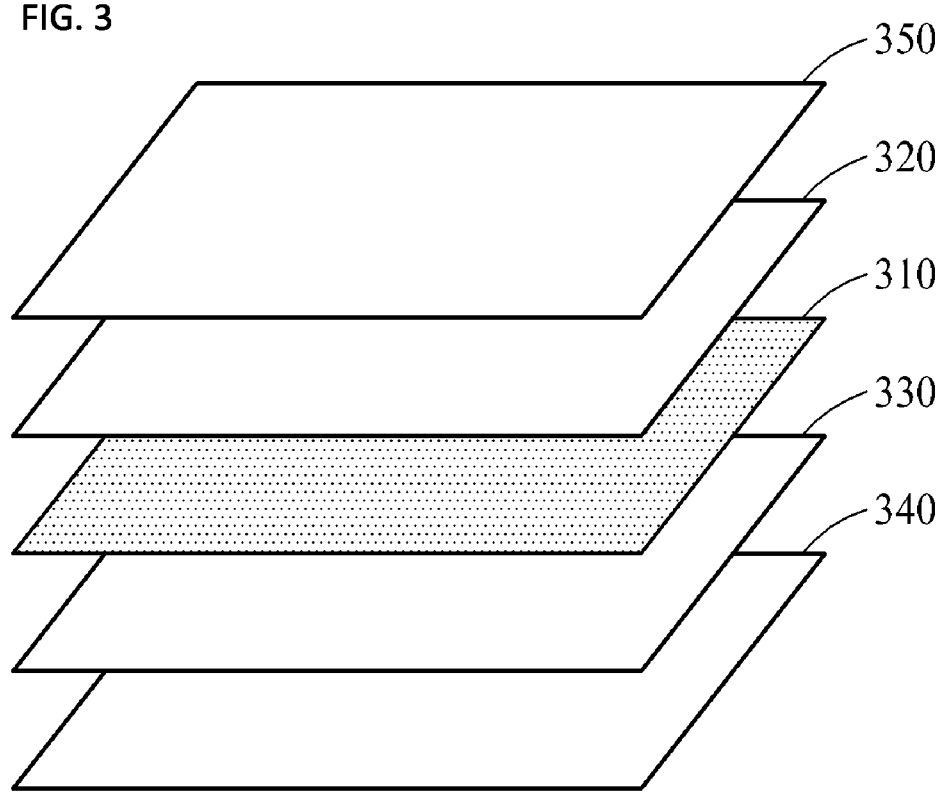
FIG. 3 illustrates an example of generating a scale space according to an embodiment.

FIG. 3 illustrates an example of generating a scale space according to an embodiment. The key point detector 112 may generate an image 320 by performing a convolution operation on an image 310 and changing a σ value included in a high-order LoG operator, to k⁴σ.

The key point detector 112 may generate an image 330 by performing the convolution operation on the image 310 and changing the σ value to k³σ.

The key point detector 112 may generate an image 340 by performing the convolution operation on the image 310 and changing the σ value to k²σ.

The key point detector 112 may generate an image 350 by performing the convolution operation on the image 310 and changing the σ value to kσ.

Figure 4:
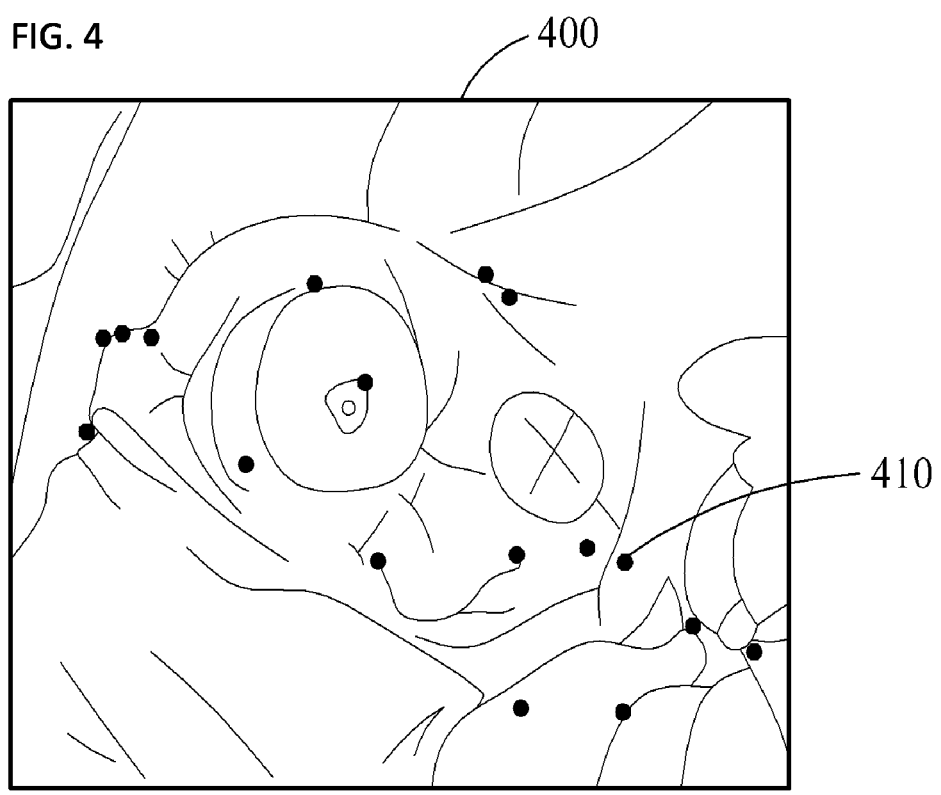
FIG. 4 illustrates an example of a keypoint detected according to an embodiment.

The images 320, 330, 340, and 350 may form a scale space of the image 310. FIG. 4 illustrates an example of a keypoint detected according to an embodiment. Referring to FIG. 4, the key point of image detecting apparatus 100 detects, using a high-order LoG kernel, a plurality of key points, for example, a key point 410, from an image 400. Referring to FIG. 2, a number of non-zero values may increase in the high-order LoG kernel than of an LoG kernel.

Accordingly, the key point of image detecting apparatus 100 may detect a greater number of the key points from the image 400 than when the key point of image detecting apparatus 100 uses the LoG kernel.

Figure 5:
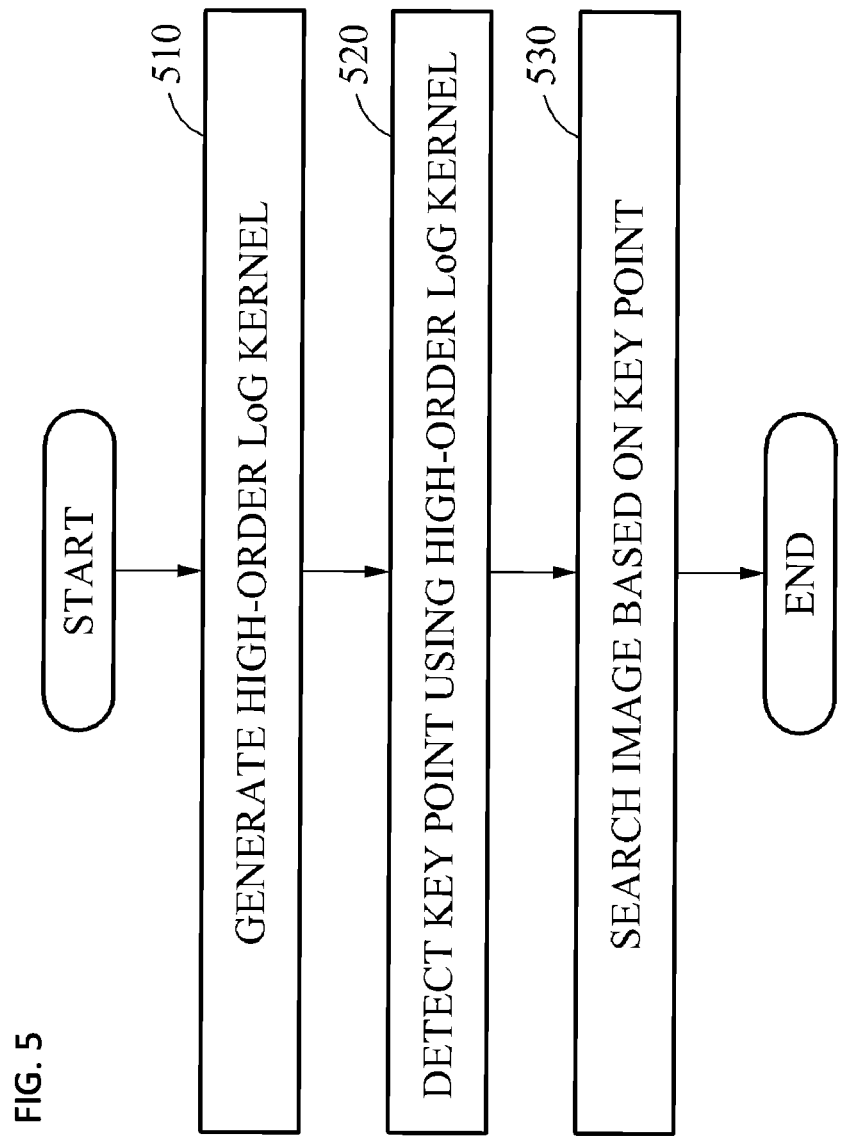
FIG. 5 is a flowchart illustrating a method of detecting a key point of an image according to an embodiment.

FIG. 5 is a flowchart illustrating a method of detecting a key point of an image according to an embodiment.

In operation 510, the LoG kernel generator 111 generates a high-order LoG kernel using an LoG operator. The LoG kernel generator 111 may calculate a high-order LoG operator by sequentially differentiating the LoG operator with respect to x and y axes of an image.

The LoG kernel generator 111 may generate the high-order LoG kernel based on the calculated high-order LoG operator. The high-order LoG kernel may be a mask for performing a convolution on a function using the high-order LoG operator.

In operation 520, the key point detector 112 detects a key point of an image using the high-order LoG kernel generated in operation 520.

The key point detector 112 may generate a scale space by performing a convolution operation on the image based on the high-order LoG kernel generated by the LoG kernel generator 111. The key point detector 112 may detect the key point by comparing a current pixel in the generated scale space to pixels adjacent to the current pixel.

In operation 530, the image searcher 113 searches an image corresponding to a current image based on the key point detected in operation 520.

The image searcher 113 may calculate a similarity between a key point detected from the current image and a key point detected from another image by comparing the key point detected from the current image to the key point detected from another image.

The image searcher 113 may search for a number of key points of which the calculated similarity is greater than or equal to a threshold value.

The image searcher 113 may determine another image of which the found number of key points is greater than or equal to the threshold value, as an image corresponding to the current image.

Figure 6:
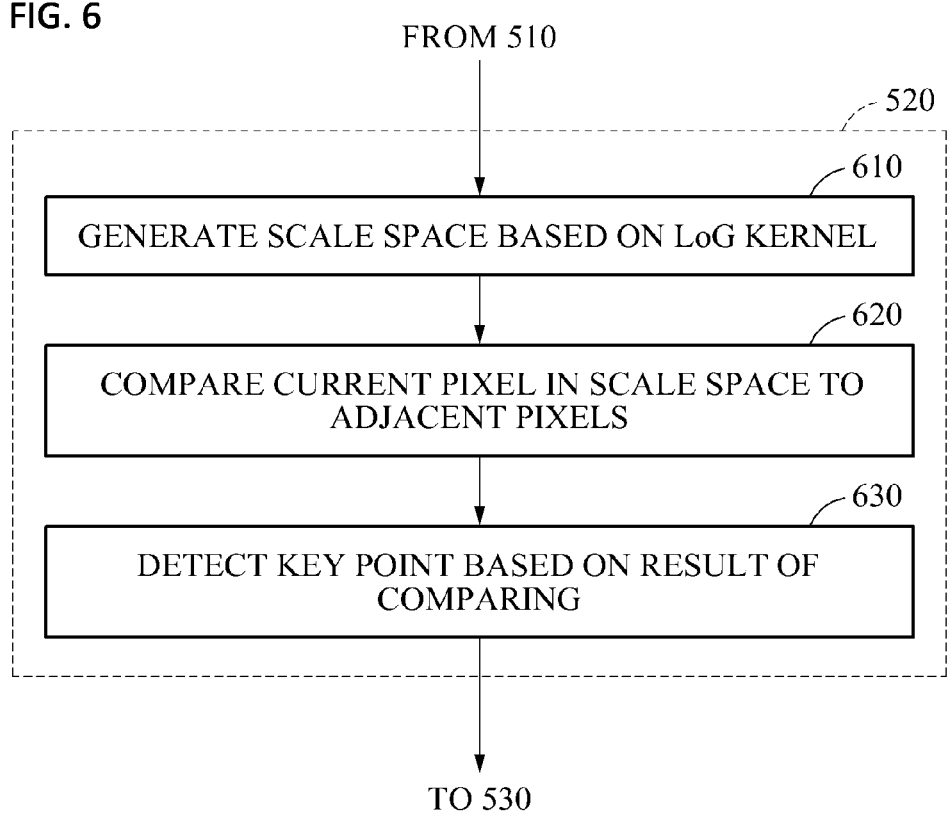
FIG. 6 is a flowchart illustrating a key point detecting process of a method of detecting a key point according to an embodiment.

FIG. 6 is a flowchart illustrating a key point detecting process of a method of detecting a key point according to an embodiment. Operations 610, 620, and 630 in FIG. 6 may include in operation 520 in FIG. 5.

In operation 610, the key point detector 112 generates a scale space by performing a convolution operation on an image based on a high-order LoG kernel.

In operation 620, the key point detector 112 compares a current pixel to be currently processed among pixels of a plurality of images included in the scale space to adjacent pixels adjacent to up, down, left and right of the current pixel.

In operation 630, the key point detector 112 detects the key point from the image based on a result of comparing the current pixel and the adjacent pixels. The key point detector 112 may detect a pixel indicating a maximum value or a minimum value among the adjacent pixels, as the key point of the image.

According to an embodiment, it is possible to detect an additional key point in addition to a key point to be detected using a DoG kernel or the LoG kernel, by detecting a key point using a high-order LoG kernel generated based on a high-order differential coefficient of the LoG operator. Concisely, since it is possible to detect more key points than a conventional key point detecting apparatus, a superior result may be obtained in image processing based on a key point, for example, image searching and panorama image generating.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of detecting a key point of an image, the method comprising:
    calculating a high-order Laplacian of Gaussian (LoG) operator by sequentially differentiating an LoG operator with respect to x and v of an image;
    generating the high-order LoG kernel based on the high-order LoG operator;
    generating a scale space based on the high-order LoG kernel; and
    detecting the key point by comparing a current pixel in the scale space to pixels adjacent to the current pixel,
    wherein the high-order LoG kernel is a mask for performing a convolution on a function using the high-order LoG operator.

2. The method of claim 1, wherein the high-order LoG operator is a high-order differential coefficient of the LoG operator.

3. The method of 1, wherein the generating of the scale space comprises generating the scale space by performing a convolution operation on the image by changing a σ value comprised in a high-order LoG operator to kσ, $k^2σ$, $k^3σ$, and $k^4σ$, using a predetermined constant k.

4. The method of claim 1, further comprising:
    searching an image corresponding to a current image based on the key point.

5. The method of claim 4, wherein the searching of the image comprises searching for a number of key points of which a similarity between a key point detected from a current image and a key point detected from another image is greater than or equal to a threshold value, and determining another image of which the found number of key points is greater than or equal to the threshold value, as the image corresponding to the current image.

6. An apparatus for detecting a key point of an image, the apparatus comprising:

a processor configured to generate a high-order Laplacian of Gaussian (LoG) kernel using an LoG operator and detect a key point of an image using the high-order LoG kernel, wherein the processor is configured to calculate a high-order LoG operator by sequentially differentiating the LoG operator with respect to x and y of an image and generate the high-order LoG kernel based on the high-order LoG operator and generate a scale space based on the high-order LoG kernel and detect the key point by comparing a current pixel in the scale space to pixels adjacent to the current pixel, and the high-order LoG kernel is a mask for performing a convolution on a function using the high-order LoG operator.

7. The apparatus of claim 6, wherein the high-order LoG operator is a high-order differential coefficient of the LoG operator.

8. The apparatus of claim 6, wherein the processor is configured to generate the scale space by performing a convolution operation on the image by changing a $\sigma$ value comprised in a high-order LoG operator to $k\sigma$, $k^2\sigma$, $k^3\sigma$, and $k^4\sigma$, using a predetermined constant k.

9. The apparatus of claim 6, wherein the processor is configured to search an image corresponding to a current image based on the key point.

10. The apparatus of claim 9, wherein the processor is configured to search for a number of key points of which a similarity between a key point detected from a current image and a key point detected from another image is greater than or equal to a threshold value, and determine another image of which the found number of key points is greater than or equal to the threshold value, as the image corresponding to the current image.

* * * * *